United States Patent
Shneyderman et al.

(10) Patent No.: US 12,267,215 B2
(45) Date of Patent: *Apr. 1, 2025

(54) DYNAMIC AND CONFIGURABLE LOCAL MESH NETWORK FOR VIDEO CONFERENCE

(71) Applicant: Zoom Video Communications, Inc., San Jose, CA (US)

(72) Inventors: Alexander Shneyderman, Wayne, NJ (US); Nicholas Alexander Sieracki, Sylmar, CA (US); Michael Adrian White, Alpine, UT (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,979

(22) Filed: Dec. 1, 2023

(65) Prior Publication Data

US 2024/0171475 A1    May 23, 2024

Related U.S. Application Data

(63) Continuation of application No. 17/973,349, filed on Oct. 25, 2022, now Pat. No. 11,870,660.

(51) Int. Cl.
*H04L 41/16*    (2022.01)
*H04L 41/0896*    (2022.01)
(Continued)

(52) U.S. Cl.
CPC .......... *H04L 41/16* (2013.01); *H04L 41/0896* (2013.01); *H04L 65/403* (2013.01); *H04L 65/75* (2022.05)

(58) Field of Classification Search
CPC .... H04L 65/75; H04L 65/403; H04L 41/0896
See application file for complete search history.

(56) References Cited

U.S. PATENT DOCUMENTS 9,264,464 B2    2/2016    Garcia, Jr. et al.
9,420,518 B2 *  8/2016    Purohit ............... H04W 40/244
(Continued)

FOREIGN PATENT DOCUMENTS

EP    3982641 A1    4/2022

OTHER PUBLICATIONS

U.S. Appl. No. 17/973,349, "Final Office Action", dated Jun. 8, 2023, 12 pages.
(Continued)

*Primary Examiner* — Kristie D Shingles
(74) *Attorney, Agent, or Firm* — Kilpatrick Townsend & Stockton LLP (57)    ABSTRACT

Audio, video conferencing with a dynamic, configurable mesh network is disclosed. A mesh reliability variable can condition the design of the mesh network between a high resiliency mode and a bandwidth saving mode. Artificial intelligence techniques and ranking techniques are provided to design the mesh network and determine which client machines are to act as parent nodes and/or child nodes. A Media Distribution Server (MDS) can provide the audio, video conference stream to the assigned parent nodes in the mesh network. The parent nodes can provide the stream to one or more child nodes over the local area network, conserving the external bandwidth of a recipient of the audio, video conference stream.

20 Claims, 6 Drawing Sheets

(51) Int. Cl.
*H04L 65/403* (2022.01)
*H04L 65/75* (2022.01)

(56) References Cited

U.S. PATENT DOCUMENTS

| | | | |
|---|---|---|---|
| 9,565,620 B2* | 2/2017 | Dukes | H04W 40/246 |
| 11,870,660 B1 | 1/2024 | Shneyderman et al. | |
| 2017/0272273 A1* | 9/2017 | Singla | H04W 76/12 |
| 2019/0041835 A1* | 2/2019 | Cella | H03M 1/12 |
| 2020/0162991 A1* | 5/2020 | Roux | H04L 45/48 |
| 2021/0014113 A1 | 1/2021 | Guim Bernat et al. | |
| 2021/0297460 A1* | 9/2021 | Bouazizi | H04L 65/765 |

OTHER PUBLICATIONS

U.S. Appl. No. 17/973,349, "Notice of Allowance", dated Aug. 30, 2023, 8 pages.
PCT/US2023/031645, "International Search Report and the Written Opinion", dated Jan. 5, 2024, 9 pages.

* cited by examiner

DYNAMIC AND CONFIGURABLE LOCAL MESH NETWORK FOR VIDEO CONFERENCE

CROSS-REFERENCE TO RELATED APPLICATION

This application is a continuation of and claims priority to U.S. patent application Ser. No. 17/973,349, entitled "Dynamic And Configurable Local Mesh Network For Video Conference," filed on Oct. 25, 2022, the entirety of which is hereby incorporated by reference herein.

FIELD

This application relates to the field of managing network traffic flow and more particularly to management of local network traffic flow for providing improved online audio, video conferencing experience.

SUMMARY

The appended claims may serve as a summary of this application.

DETAILED DESCRIPTION OF THE DRAWINGS

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Overview

Figure 1:
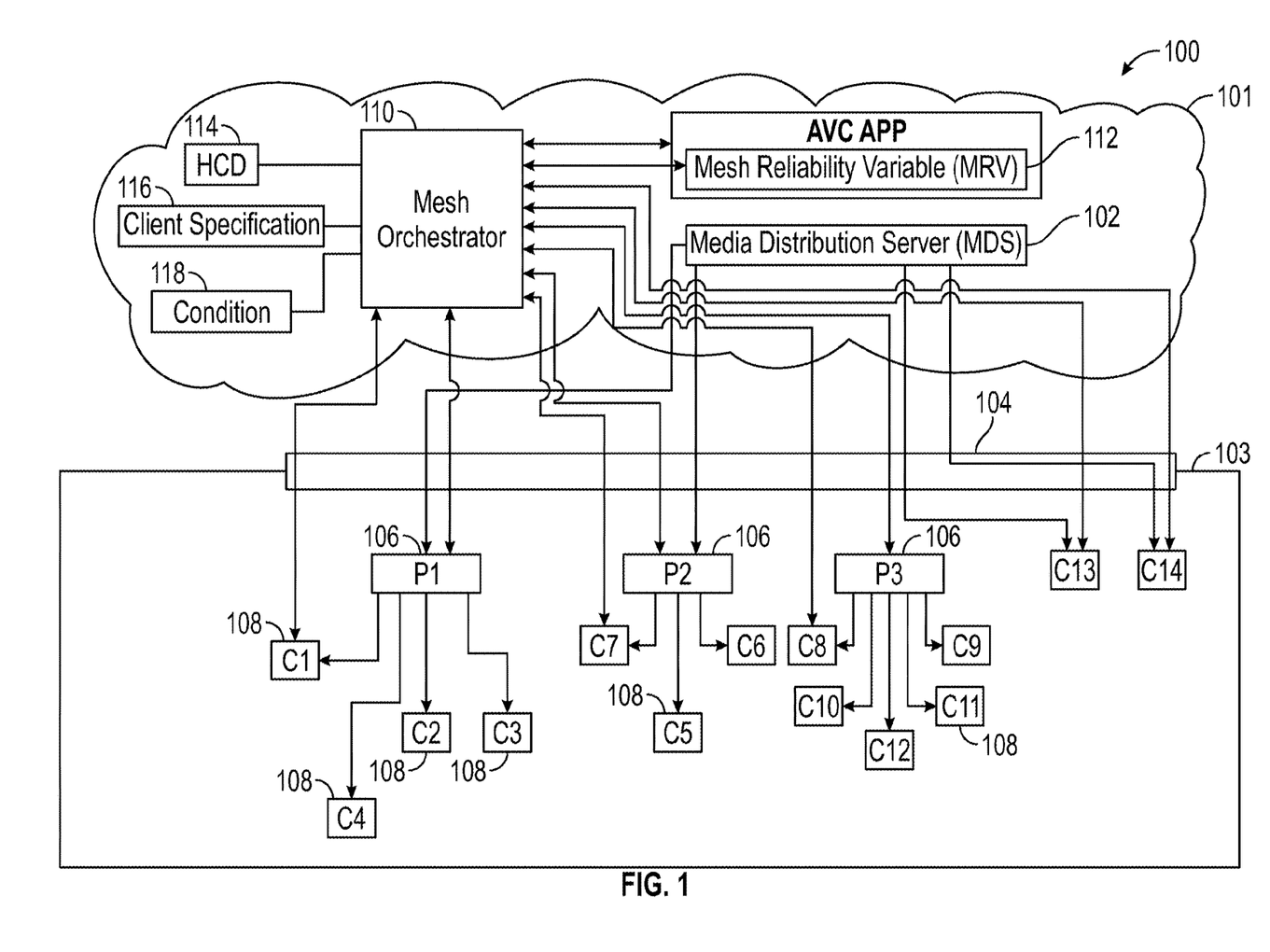
FIG. 1 illustrates an audio, video conference environment in which a mesh network is used to improve the traffic flow for an audio, video conference session.

Online audio, video conferencing (AVC) has become a critical part of the modern work environment. During the pandemic of COVID-19 many businesses relied on AVC applications to enable remote work, connect their workforce, and conduct business. However, the applications of a robust AVC can be extended beyond only remote work. For example, as workers return to the office work environment, there is still a need for connecting a large workforce distributed across multiple offices and physical workspaces with a robust AVC application. When employees are utilizing AVC applications from their homes, the network traffic burden is distributed across the Internet. As employees return to their offices, network and traffic workflow management can present challenges to an information technology (IT) department, as a large number of employees may attempt to utilize the business' Internet resources to connect with and execute AVC applications. In particular, each physical location and traditional office environment may only have access to a limited bandwidth to serve internet traffic to and from the office buildings. AVC applications can be bandwidth intensive, utilizing a non-trivial amount of bandwidth per AVC participant, in order to transmit audio and/or video signals. In particular, AVC applications deployed in a traditional office environment can consume a substantial amount of the business' available bandwidth if a large number of users attempt to subscribe to an AVC stream at the same time. In these instances, the same copy of the stream is distributed to multiple AVC participants at the same time, taking up a potentially large portion of the available bandwidth of an office. This can cause disruptions and/or delays in the management and handling of network traffic flow at the local level, where the AVC performance and/or other online application performances can degrade. Consequently, there is a need for robust network traffic management techniques for an AVC application to avoid unnecessary consumption of the limited bandwidth of an office environment. Mesh network in an AVC environment FIG. 1 illustrates an AVC environment 100 in which a mesh network is used to improve the network traffic flow for an AVC session. An AVC session can be enabled by an AVC infrastructure deployed over the Internet. A cloud infrastructure 101 may be provided that includes a Media Distribution Server (MDS) 102. The media distribution server 102 accepts subscribers or connections from a recipient 103 and provides AVC streams to client computers at the recipient 103. The recipient may have multiple client machines 106, 108 that receive media via a data stream from the media distribution server. The recipient 103 has an available bandwidth 104 through which it handles Internet and network traffic flow to and from the recipient 103. The AVC administrator can provide an AVC application 105 to the IT personnel of the recipient 103 via which the AVC behavior, as it relates to the recipient 103 can be manipulated, configured or otherwise set up according to the requirements of the IT personnel of the recipient 103. The AVC application 105 can also be configured with default parameters. Individual client machines 106, 108 can also include an AVC application, via which they can communicate with one another or the resources of the cloud infrastructure 101. The communication of the client machines 106, 108 with one another, as the communication relates to an AVC session can occur over a local area network of the recipient 103, not impacting the available bandwidth 104.

Without use of a mesh network according to the described embodiments, various client machines 106, 108 of the recipient 103, each individually and separately subscribe to an AVC stream from the Media Distribution Server (MDS) 102. In this scenario, the Media Distribution Server (MDS) 102 may serve multiple, identical copies of an AVC stream to multiple client machines at the recipient 103. Each stream (although identical) is served through the available bandwidth 104. The client machines 106, 108 may be various computing devices of the AVC participants at the recipient 103. An example scenario, where multiple client machines from the recipient 103 may attempt to subscribe to the same AVC stream from the Media Distribution Server (MDS) 102 is during a company-wide, all-hands AVC meeting and/or during similar events. In these scenarios, the available bandwidth 104 can be consumed by multiple identical streams served simultaneously or near-simultaneously to multiple client machines 106, 108. The local network traffic flow in these and similar circumstances can be substantially improved by introduction of a mesh network according to the described embodiments.

A subset of the client machines subscribing to an AVC stream may be assigned to act as parent nodes 106 and the client machines may be assigned to act as child nodes 108. The parent nodes 106 receive the AVC stream through the available bandwidth 104 and serve the AVC stream to their designated child nodes 108. In this manner, the Media Distribution Server (MDS) 102 can reduce the number of AVC streams it serves across the available bandwidth 104, consequently, conserving the bandwidth resources of the recipient 103. In one embodiment, the AVC cloud infrastructure 101 can include a mesh orchestrator 110, which can include the functionality to assign a client machine as a parent node or a child node before or during an AVC session. In some embodiments, the mesh orchestrator 110 can provide the assignment of a client machine to a parent node or a child node based on a Mesh Reliability Variable (MRV) 112, received via the AVC application 105.

The mesh reliability variable 112 can control the mesh orchestrator 110 to assign a higher number of client machines as parent nodes 106 leading to a more robust AVC session, or to assign a lower number of client machines as parent nodes, leading to more bandwidth conservation during an AVC session. The robustness of an AVC session can relate to many factors but can also be correlated with the robustness of the mesh network. The robustness of a mesh network can be defined in terms of how frequently the mesh network has to be redefined or reorganized during an AVC session. The mesh network may need to be redefined or reorganized when some event disrupts the current mesh network. For example, an event that may disrupt the current mesh network may be a previously assigned parent node may go offline, such as when a corresponding user closes their laptop, which was operating as a parent node 106, and leaves an AVC session. A mesh network redefinition or reorganization may be needed due to other factors, such as a parent node 106 crashing, experiencing network interruptions or maxing out its CPU and/or GPU capacity. The mesh orchestrator 110 can redefine and reorganize a mesh network by assigning new parent nodes/child nodes when the conditions of the mesh network are altered. Redefining or reorganizing the mesh network can also be referred to as the mesh network reconverging. When the mesh network is redefined or reorganized more parent nodes may be added, and client machines acting as client nodes may be reassigned to the newly create parent nodes. In other situations, existing parent nodes may go offline or be changed to a client node, and the current client machines acting as client nodes that are assigned to these existing parent nodes, may be reassigned to other parent nodes.

The more parent nodes 106 a mesh network has, the less frequently the mesh has to reconverge and the more robust the mesh network can be. More parent nodes in a mesh network definition translate to consuming more of the available bandwidth 104 for an AVC session. This occurs because each of the parent nodes has a connection to the MDS and is consuming network bandwidth to receive streamed media. Conversely, the fewer parent nodes 106 a mesh network has, the more frequently the mesh may have to reconverge and the less robust the mesh network can be. However, fewer parent nodes in a mesh network definition translate to consuming less available bandwidth 104 for an AVC session. While the mesh orchestrator 110 can define the mesh automatically to provide a reliable AVC experience, the IT personnel of the recipient 103 can provide the Mesh Reliability Variable (MRV) 112 to condition the mesh orchestrator 110 to lean more on the side of bandwidth conservation versus leaning more on the side of mesh robustness when defining the mesh network or assigning parent nodes and/or child nodes.

In one configuration, the mesh reliability variable (MRV) 112 may include multiple thresholds. For example, the mesh reliability variable (MRV) 112 may include an upper constraint that defines the maximum number of client machines that can be assigned as parent nodes and a lower constraint that defines the minimum number of client machines that are to be assigned as parent nodes. The mesh reliability variable (MRV) 112 may also include other factors that affect the mesh network, such as the amount of time between reconverging and the bandwidth assigned to different parent nodes. The mesh orchestrator 110 may periodically evaluate mesh network configuration and adjust the number of parent nodes to achieve the desired reliability.

The mesh orchestrator 110 can use a variety of techniques for defining the mesh network. For example, data collected from previous mesh networks can be used to define subsequent mesh networks. The performance of a particular client machine as a parent in a previous mesh network can be used to extrapolate a prediction of the performance of the same client machine as a parent in future mesh networks. If the client machine has had a history of robust performance as a parent node, the machine maybe more likely to be used as a parent in subsequent mesh networks. Alternatively, or in addition, the behavior of a user of a client machine can also be indicative of future performance as a parent. For example, if a user typically remains a participant for the entire duration of an AVC session, the user's client machine may be a good candidate for being assigned as a parent node in a future mesh network The historical performance of a machine in a previous mesh network and the behavior of the user-owner of the client machine can be parameters termed historical client data (HCD) 114, which can be used by the mesh orchestrator 110 in designing a mesh network.

Another potential source of data for the mesh orchestrator 110 when designing a mesh network is the Client Specification 116 of the client machines. These can include hardware specifications, such as available central processing unit (CPU) power, graphical processing unit (GPU) power, available amount and type of memory (e.g., on-chip, volatile, non-volatile, speed and type of the hard drive), type and speed of network connection, and other machine parameters that can correlate with predicting a performance of a client machine as a parent node in a mesh network design. Another source of data for designing a mesh network can include conditions 118. The conditions 118 can refer to the age of a client machine, or age of the components of a client machine. The more powerful and newer client machines, based on parameters such as Client Specification 116 and conditions 118, are more suitable for assigning as parent nodes in a mesh network design.

In some embodiments, the mesh orchestrator 110 can automatically operate to design a mesh network to optimize the usage of the bandwidth 104. In other embodiments, the IT personnel of the recipient 103 can provide an input to condition the orchestrator 110 to skew the design of a mesh network in various directions of bandwidth conservation versus mesh network convergence frequency and stability. In one embodiment, the administrator of the local network of the recipient 103 can provide a Mesh Reliability Variable (MRV) 112, which the mesh orchestrator 110 can use to skew the design of a mesh network.

In some embodiments, the mesh orchestrator 110 can modify and/or adjust the Mesh Reliability Variable (MRV) 112, based on a variety of factors. For example, in some embodiments, the Mesh Reliability Variable 112 can be adjusted, based on feedback received from the client machines. The feedback can include a variety of data, such as how the client machine performed in a previous mesh network.

In some embodiments, the Mesh Reliability Variable (MRV) 112 can be a static variable that does not change for the duration of a mesh network. In other embodiments, the Mesh Reliability Variable (MRV) 112 can be dynamically adjusted based on various conditions in which the mesh network operates. For example, in some implementations, the Mesh Reliability Variable (MRV) 112 can dynamically change based on a variety of factors, including changes to at least one of network conditions, the total number of client machines operating in the mesh network, the available network bandwidth, performance indicators of the client machines, and bandwidth requirements of the mesh network. When the Mesh Reliability Variable (MRV) 112 is dynamically adjusted, the corresponding mesh network is also dynamically altered based on the adjusted Mesh Reliability Variable (MRV) 112.

Figure 2:
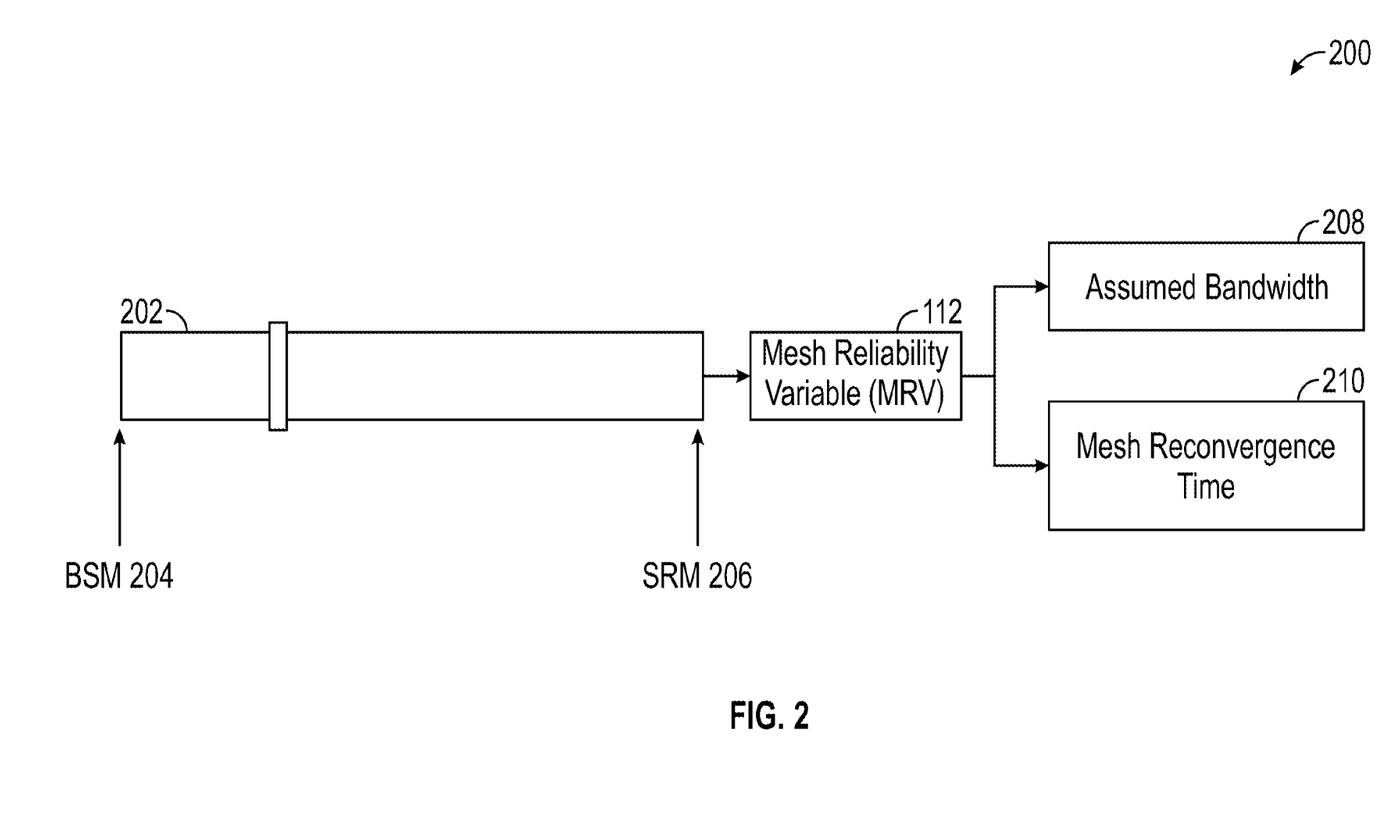
FIG. 2 illustrates a user interface element for providing a Mesh Reliability Variable (MRV) and the relationship between the Mesh Reliability Variable (MRV) and other mesh network variables.

FIG. 2 illustrates a diagram of a user interface (UI) element 200 for providing a Mesh Reliability Variable (MRV) 112 and the relationship between the Mesh Reliability Variable (MRV) 112 and other mesh network variables. The UI element 200 can include a slider 202, which allows an IT personnel to provide an input for the Mesh Reliability Variable (MRV) 112. On one extreme, the slider 202 can indicate an input for the Mesh Reliability Variable (MRV) 112 leading to a bandwidth saving mode (BSM) 204. The bandwidth saving mode (BSM) 204 conditions the mesh orchestrator 110 to assign a minimum number of parent nodes, such that the parent nodes and the client nodes in the mesh network still receive a reliable AVC stream. On the other extreme, the slider 202 can indicate an input for the Mesh Reliability Variable (MRV) 112 leading to a streaming resiliency mode (SRM) 206. The streaming resiliency mode (SRM) 206 conditions the mesh orchestrator 110 to assign an optimal number of parent nodes based on the available bandwidth 104 to provide an optimally stable (e.g., highest stability metric) mesh network. Consequently, the SRM 206 provides the most resilient mesh network allowable by available bandwidth 104. The mesh network resulting from the streaming resiliency mode (SRM) 206 has the minimum possible mesh convergence allowable under the available bandwidth 104. The IT personnel can choose to place the slider 202 at any point at or in between the two extremes of the bandwidth saving mode (BSM) 204 and the streaming resiliency mode (SRM) 206. The slider 202 and the corresponding Mesh Reliability Variable (MRV) 112 can indicate, or in turn correspond to, an assumed bandwidth 208 within which the mesh orchestrator 110 can design a mesh network and a mesh convergence time 210. The variables 208, 210 can become internal variables in the mesh orchestrator 110 from which it can define a mesh network. The UI element 200 and its corresponding variables 112, 208, 210 are provided as examples. Persons of ordinary skill in the art can implement user-control of the mesh design in various other methods, using other UI elements or other internal variables.

Figure 3:
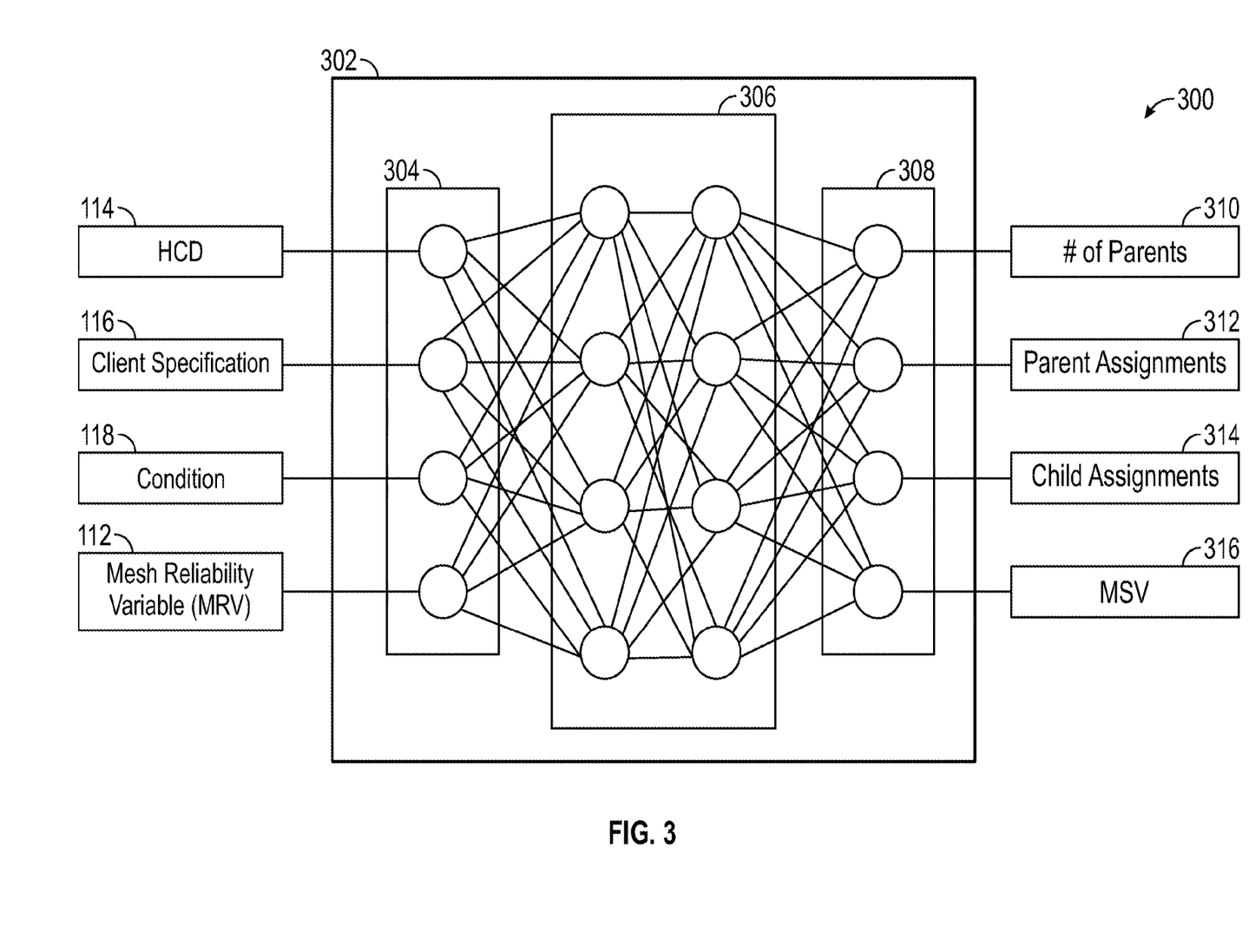
FIG. 3 illustrates a diagram of an artificial intelligence (AI) network used by a mesh orchestrator to design a mesh network.

The mesh orchestrator 110 can utilize a variety of techniques to arrive at a mesh network configuration or design. In some embodiments, one or more artificial intelligence (AI) networks can be used. FIG. 3 illustrates a diagram 300 of an AI network 302 used by the mesh orchestrator 110 to design a mesh network. In some embodiments, the AI network 302 can receive a selection of inputs and parameters and output a design of a mesh network. The network configuration or design can include determining the number of parent nodes in the mesh network via an assignment of client machines to serve as parent nodes, and an assignment of client machines to be child nodes of the assigned parent nodes. The client machines assigned as child nodes would receive streaming media from the MDS via their assigned parent node.

In some embodiments, the AI network 302 can be a neural network, having input layer 304, hidden layers 306 and output layer 308. A variety of inputs and parameters can be provided to the AI network 302. Examples include each client machine's HCD 114, Client Specification 116, and conditions 118. The AI network 302 also receives a Mesh Reliability Variable (MRV) 112. The AI network 302 can include a multiple neural network nodes organized in one or more layers (e.g., the input layer 304, the hidden layer 306 and the output layer 308). Each node of the AI network 302 has one or more inputs, an activation function, and an output. The inputs and outputs may generally be real number values. Consequently, one or more correlation equations can be used to link the non-numerical variables, such as parent assignments 312 and child assignments 314 to real number values, thereby these variables to be used in the AI network 302. Other variables in the input of the AI network 302 can also be quantified in a similar manner. The inputs to a node are combined through a linear combination with weights, and the activation function is applied to the result to produce the output of the node. The output of a node may be expressed as Output=$g(W_0+W_1X_1+W_2X_2+ \ldots +W_iX_i)$ where $W_i$ are weights, $X_i$ are input values, and g is the activation function. The output may be transmitted as an input to one or more other nodes in subsequent layers. The weights in the linear combination may be referred to as the weights of the node, and each node may have different weights. The nodes may be organized in one or more layers. An input layer 304 may comprise input nodes whose values may correspond to inputs to the AI network 302, without use of an activation function. An output layer 308 may comprise one or more output nodes corresponding to output from the AI network 302. Neural network layers other than the input layer and output layer may be hidden layers 306, and the nodes in those layers may be referred to as hidden nodes.

In some embodiments, the AI network 302 can be initialized with a set of variables HCD 114, Client Specification 116 and conditions 118 for a multiple client-machines C1-CN. In the diagram 300 only some nodes are illustrated for simplicity and ease of visualization. In practice, more nodes can be used. The AI network 302 can also receive a Mesh Reliability Variable (MRV) 112. The output of the AI network 302 can be the number of parent nodes in a mesh network design 310, assignment of client machines to the parent nodes or parent assignments 312, assignment of client machines, as child nodes to the assigned parent machines or child assignments 314, and a mesh stability variable (MSV) 316 of the assigned mesh design. The MSV 316 is an output parameter of the AI network 302, which can be defined based on a relationship between the other output parameters of the AI network 302, such as the number of parent nodes, parent and child node assignments and/or other mesh network parameters that may be used at the output of the AI network 302. Persons of ordinary skill in the art can envision a variety of definitions to relate the mesh network parameters at the output of the AI network 302 with the MSV 316. For example, the MSV 316 can be defined based on a predicted performance of a mesh network defined based on parameters, such as number of parent nodes and parent and child node assignments. The AI network 302 can choose output parameters related to the mesh network, such as the number of parent nodes 310 and the parent node assignment 312, and the child node assignments 314, such that the MSV 316 can be equal or near equal to the Mesh Reliability Variable (MRV) 112. Initially, the weights, activation functions and the output nodes 310, 312, 314 and 316 can be randomly assigned. Then the weights and activation functions can be modified until the value of the MSV 316 in the output equals the value of the Mesh Reliability Variable (MRV) 112 in the input. In some embodiments, the MSV 316 can be a variable outside of the output of the AI network 302, where the output parameters of the AI network 302 related to the mesh network determine the value of the MSV 316. In this scenario, the AI network 302 chooses the values of the output nodes that yield an MSV 316 equal or near equal to the value of the Mesh Reliability Variable (MRV) 112. In other embodiments, as shown in the diagram 300, the MSV 316 can be placed as an output node of the AI network 302, where the AI network 302 can modify its weighs, activation functions, and the other output nodes, such as the number of parent nodes 310, the parent node assignments 312, and the child node assignments 314 until the value of the output node MSV 316 converges on the value of the Mesh Reliability Variable (MRV) 112. Alternatively, the AI network 302 can fix the value of the output node 316 to be equal or near equal to the value of the MSV 112 and modify the weights and activation functions until it arrives at a set of other output parameters that satisfy a defined relationship between the MSV 316 and the other output parameters.

A variety of techniques can be used in training and adjusting the weights of the AI network 302. In some embodiments, a ground truth can be arrived empirically and provided for the training purposes. In some implementations, a stochastic gradient descent with randomly initialized weights can be used. In one embodiment, training may use backpropagation to adjust the weights of the layers of the AI network by using partial derivatives of a loss function.

The value of the loss function can depend on the training examples used and the difference between the outputs 310, 312, 314, 316 and the known ground-truth value for each training example. In this scenario, the parent node assignments 312 and the child node assignments 314 can be quantified with one or more variables, so the difference between their values and the ground truth can be determined. An optional regularization expression may be added to the loss function in which case the value of the loss function may also depend on the magnitude of the weights of the AI network 302. Backpropagation may be used to compute the partial derivative of the loss function with respect to each weight of each node of each layer of the AI network 302, starting from the final layer and iteratively processing the layers from back to front. Each of the weights may then be updated according to the computed partial derivative by using, for example, gradient descent. For example, a percentage of the weight's partial derivative, or gradient, may be subtracted from the weight, where the percentage is determined by a learning rate. The learning rate is a tuning parameter that determines the step size at each iteration of the optimization algorithm used in the AI network 302 while the algorithm seeks to move toward a minimum of a loss function.

Persons of ordinary skill in the art will appreciate that the AI network 302 and neural networks in general are provided as examples, and other AI engines can also be used, where given the set of inputs, such as HCD 114, Client Specification 116 and conditions 118, the AI engine can determine an optimized assignment of parent nodes and child nodes in a mesh network to provide a reliable AVC experience to all client machines involved. In some embodiments, the mesh orchestrator 110 can translate the mesh assignment into a predicted bandwidth usage variable and modify the assignment of parent nodes and child nodes until the predicted bandwidth usage matches an allocation of bandwidth indicated by the Mesh Reliability Variable (MRV) 112. In this approach, an individual bandwidth consumption prediction can be made for each assigned parent. The sum of all predicted parent bandwidth usages is the total expected bandwidth usage for a mesh design. Furthermore, the Mesh Reliability Variable (MRV) 112 can be translated into a bandwidth allocation. For example, the Mesh Reliability Variable (MRV) 112 may be received in terms of a percentage or in terms of number of parent nodes or in terms of an allocation of bandwidth. For example, the IT personnel may wish to define the Mesh Reliability Variable (MRV) 112 in terms of what portion of the available bandwidth 104 an AVC session may be allowed to use. The assumed bandwidth can be matched against the predicted total bandwidth usage of various mesh designs, and an assignment of parent nodes/child nodes that yields a predicted bandwidth usage equal to the assumed bandwidth can be used in an AVC session. Furthermore, this process can be dynamically repeated at selected intervals or every time there is a need for mesh reconvergence, when the mesh network is modified, for example, when a parent participant leaves the AVC session, or a parent network connection is otherwise interrupted.

Figure 4:
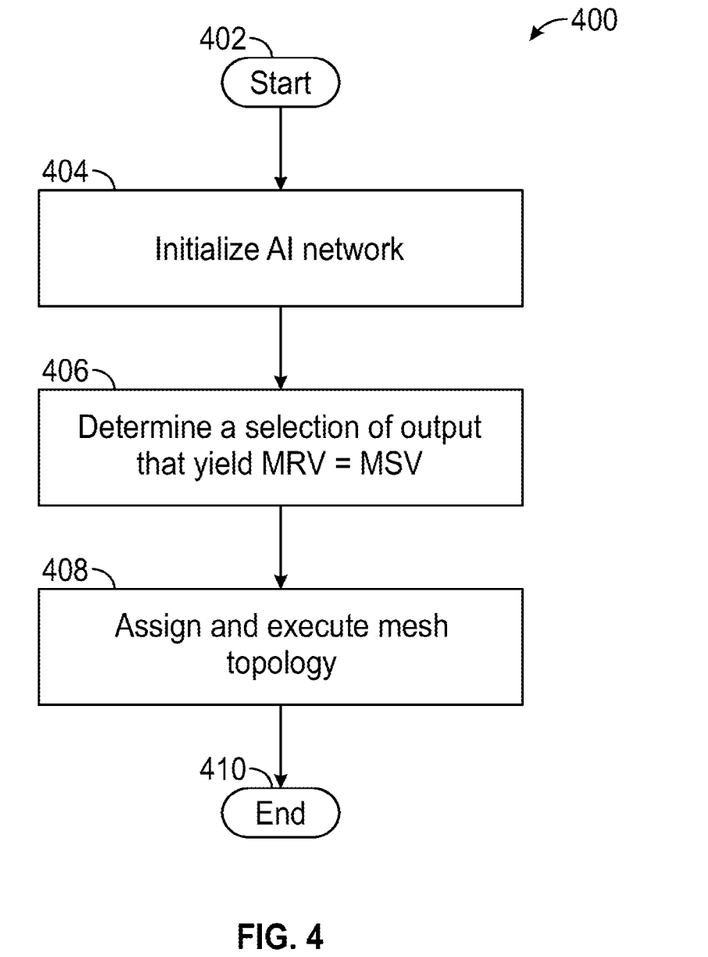
FIG. 4 illustrates a method of utilizing an AI network in designing and executing a mesh network.

FIG. 4 illustrates a method 400 of utilizing an artificial intelligence network in designing and executing a mesh network. The method starts at step 402. At step 404, an AI network, such as the AI network 302, is initialized. AI initialization can include randomly initializing weights, and activation functions. The inputs to the AI network 302 can include various network and hardware parameters of the client machines, available bandwidth 104 at the recipient 103 and a Mesh Reliability Variable (MRV) 112. The input variables can be chosen for client machines that are expected to be or are detected to be in an upcoming or ongoing AVC session. In some embodiments, the method 400 is executed by the mesh orchestrator 110, which can obtain data on client machines from one or more databases of the cloud infrastructure 101. For example, the mesh orchestrator 110 can determine which client machines at recipient 103 are in or are scheduled to attend an ongoing or upcoming AVC session for which a mesh network is to be designed. The hardware parameters of the scheduled client machines, as well as historical data of performance of these machines in previous AVC sessions, can be used as input to the AI network 302 or other artificial intelligence models.

At step 406, the weights and activation functions of the AI model are modified to yield a mesh stability variable (MSV)

316 equal or nearly equal to the Mesh Reliability Variable (MRV) 112. The modification can include trying different selections of output parameters, such as number of parent nodes 310, parent assignments 312 and child assignments 314. In some embodiments, an intermediary correlation equation quantifies the assignment variables 312, 314 with real numbers, which can be plugged in as output to the AI network used in the method 400. For example, in some embodiments, a range of numbers can be assigned to correspond to a selection of parent nodes and child nodes in a parent assignment 312 and child assignment 314 variable. Upon conclusion of the step 406, a topology of the mesh is determined. This can include determining a number of parent nodes, and assignments of client machines to parent and child nodes. At step 408, the mesh network is assigned to the client machines in an AVC session. For example, when a client machine that is assigned a child nod attempts to subscribe to an AVC stream, the child node machine is instructed to receive the AVC stream from an assigned parent node machine instead, and when a parent logs in and subscribes to the AVC session, the parent node machine is instructed to provide a copy of the AVC stream to its assigned child node machines. The client machines can each run an AVC application, which can be in communication with the mesh orchestrator and/or the Media Distribution Server (MDS) 102 to receive and execute mesh instructions. The mesh orchestrator 110 can also instruct the Media Distribution Server (MDS) 102 to provide the AVC stream only to the assigned parent node machines. If during an AVC session, a parent node machine leaves the AVC session or other mesh-altering events occur, the method 400 can be repeated to design a new mesh network and continue to provide a reliable AVC stream to the participants. The method ends at step 410.

Figure 5:
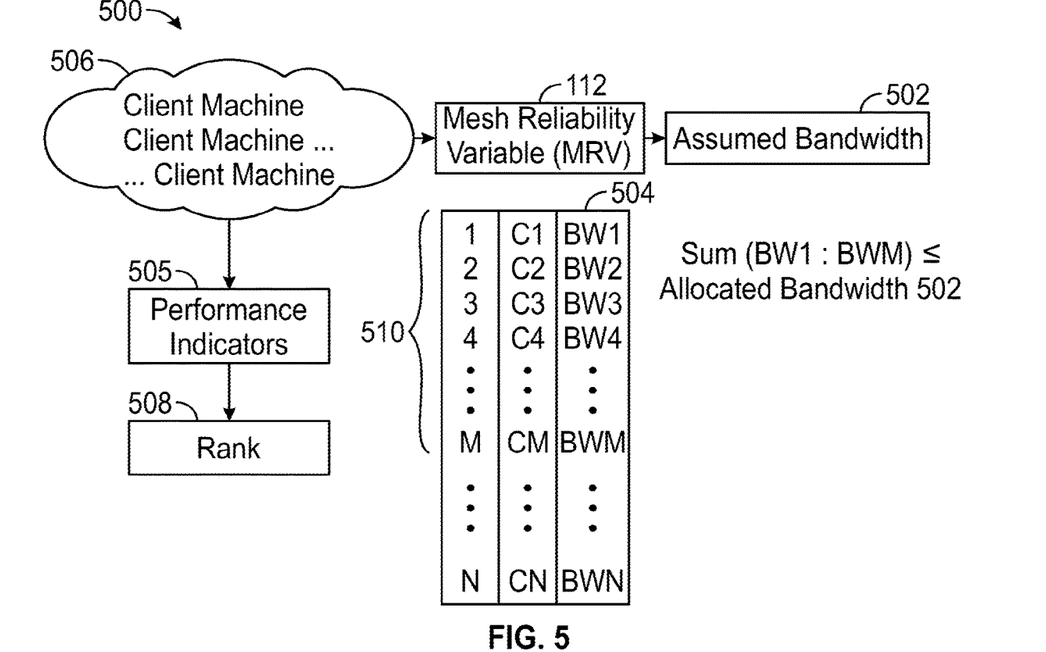
FIG. 5 illustrates a diagram of using an example ranking technique in designing a mesh network.

In some embodiments, a ranking method can be used to determine the mesh network. FIG. 5 illustrates a diagram 500 of using an example ranking technique in designing a mesh network. The Mesh Reliability Variable (MRV) 112 can be translated to assumed bandwidth 502. The assumed bandwidth 502 is a portion of the available bandwidth 104 assumed to be available to an AVC session (and the mesh network transmitting the AVC stream of the AVC session). The assumed bandwidth 502 can be determined by a variety of factors, for example if the Mesh Reliability Variable (MRV) 112 is expressed in terms of the number of parent nodes in a mesh network. an average bandwidth consumption of a parent in a mesh can be used to determine a corresponding assumed bandwidth 502. In other embodiments, the average bandwidth consumption of a parent can be determined from the HCD 114, in relation to the parent nodes that are in an AVC session or are expected to be in an AVC session. Similarly, if the Mesh Reliability Variable (MRV) 112 is expressed as a percentage or other variable, a corresponding assumed bandwidth 502 in relation to the expected number of parent nodes can be generated.

The ranking technique illustrated in the diagram 500 further includes generating a ranking table 504, where client machines 506 in an AVC session or expected to be in an AVC session are ranked based on one or more performance indicators 505. The ranking includes a prediction of the performance of a client machine 506 as a parent in a mesh design. The performance indicators 505 can include a variety of parameters. In some embodiments, the performance indicators 505 can be drawn from the HCD 114, the Client Specification 116 and the conditions 118, among other parameters. For example, performance indicators may include the past performance of a client when assigned as a parent node in a mesh network, the battery life of a client (client machines with higher battery life or plugged in to a power source may be better candidates as parent nodes), network conditions (client machines with newer, more powerful network hardware or updated firmware may be better candidates as parent nodes), machine specifications (amount of available memory, processing power, chip or client manufacturer), processor load (such as the number of other programs/activity running on the client), and proximity of a client to a network router and/or other client machines (more centrally located client machines may be better candidates as parent nodes). The client machines 506 can be assigned a rank 508. The ranks 508 can be used to generate a ranking table 504. The ranking table 504 can include a column, listing the predicted bandwidth consumptions of each ranked client. The predicted bandwidth consumption $BW_i$ of a client $C_i$ can be determined from the HCD 114. Next, the predicted bandwidth consumptions $BW_i$ can be summed to determine which range 510 of the highest ranked client machines $C_i$ are predicted to consume a total bandwidth less than the assumed bandwidth 502.

$$\text{Sum}(BW_1:BW_M) < \text{Assumed bandwidth } 502 \qquad \text{Eq. (1)}$$

The client machines C1-CM satisfying the Eq. (1) can be assigned as a parent node in the mesh network. Child nodes can be assigned by a variety of techniques, including dividing the remaining client machines 506 equally between the assigned parent nodes or assigning child nodes based on the rank of a parent node machine. For example, higher ranked parent node machines can have more child node machines assigned to the higher ranked parent node.

Persons of ordinary skill in the art will appreciate that the described AI and the ranking techniques can consider the user behavior of the users of the client machines. For example, users that are historically shown to participate in an entire length of an AVC session can influence their client machines to a higher ranked position, making it more likely that their machines may be used as a parent in a future mesh design.

Figure 6:
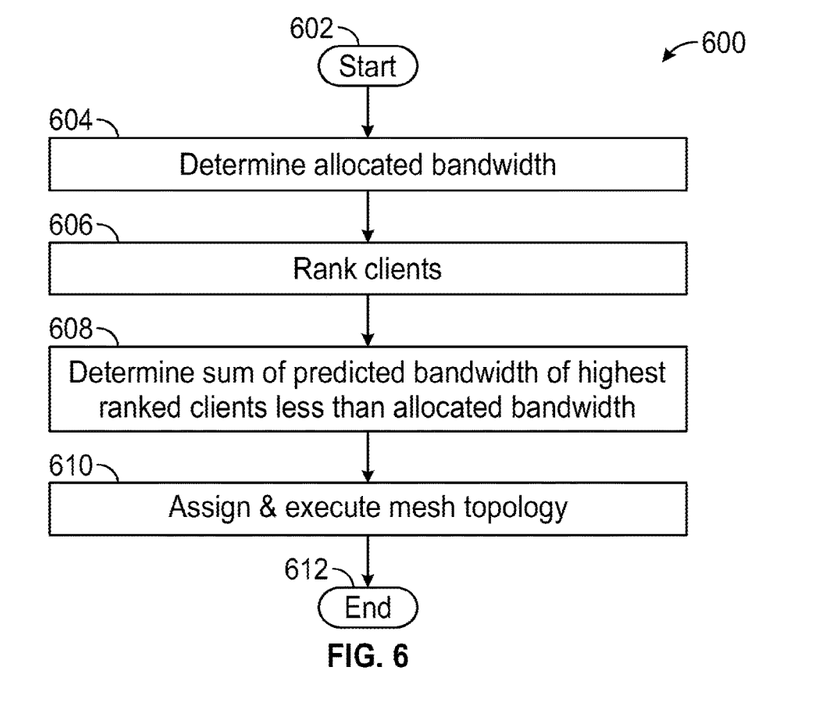
FIG. 6 illustrates a flowchart of an example ranking method used to design a mesh network.

FIG. 6 illustrates a flowchart of an example ranking method 600 used to design a mesh network. The method starts at step 602. At step 604, the Mesh Reliability Variable (MRV) 112 is used to determine an assumed bandwidth 502. Depending on the implementation of the user interface element in the AVC application 105, various techniques can be used to determine the assumed bandwidth 502 from the Mesh Reliability Variable (MRV) 112. For example, reliability percentages can be mapped to an assumed bandwidth 502. The number of parent nodes can be assumed to an assumed bandwidth 502 and so forth. The HCD 114 can be used to determine the assumed bandwidth 502. For example, if the Mesh Reliability Variable (MRV) 112 can indicate, or be correlated to indicate, a number of parent nodes in a mesh network. a historical average bandwidth consumption of a parent can be utilized to determine the assumed bandwidth 502 by multiplying the historical average by the number of parent nodes derived from the Mesh Reliability Variable (MRV) 112.

At step 606, the client machines 506 can be ranked using performance indicators 505. The performance indicators 505 can include parameters such as HCD 114, the Client Specification 116 and the conditions 118. Historical behaviors of users of client machines 506 can also be a part of the HCD 114 and be included in generating a rank 508 for a client machine 506. The ranks 508 can be used to generate the raking table 504. The ranking table 504 can also be populated with a column of predicted bandwidth consumption BWi of each ranked client Ci. The predicted bandwidth consumption BWi can be generated from the HCD 114. At step 608, a sum of predicted bandwidth consumptions of the highest ranked client machines C1-CM less than the assumed bandwidth 502 can be determined (Eq. (1)). The client machines C1-CM, satisfying the Eq. (1) can be assigned as a parent node in the mesh network, and the remaining client machines 506 may be assigned as child nodes. At step 610, the mesh network designed in step 608 is applied and executed by communicating the mesh network to the Media Distribution Server (MDS) 102 and the AVC applications installed on client machines 506. The method ends at step 612.

In some embodiments, during an AVC session, the mesh orchestrator 110 can restructure the mesh network, based on a variety of factors. For example, the mesh orchestrator 110 can modify the number and/or assignment of parent and child nodes. In some embodiments, the mesh orchestrator 110 can be configured to modify the Mesh Reliability Variable (MRV) 112, based on network conditions, including the available bandwidth 104, consumption of bandwidth by devices other than those participating in the AVC, and changes in behavior and/or bandwidth consumption of a parent node (e.g., if a user of a client machine assigned as a parent node starts downloading a large file during an AVC meeting, the Mesh Reliability Variable (MRV) 112 can be adjusted in a manner that the parent node consuming a large amount of available bandwidth 104 is no longer assigned as a parent node). In some embodiments, a local network managing the bandwidth allocation of the client devices at the recipient 103 may reduce or limit the download speed to preserve the available bandwidth 104 for the operations of the AVC.

In some embodiments, the Mesh Reliability Variable (MRV) 112 can be affected via input provided from an administrator of the local network at the recipient 103. For example, the Mesh Reliability Variable (MRV) 112 can be adjusted by conditions set by the administrator of the local network of the recipient 103 and/or by the current conditions experienced at the recipient 103. The parent and child node machines can provide feedback to the mesh orchestrator 110, which can in turn adjust the Mesh Reliability Variable (MRV) 112. The Mesh Reliability Variable (MRV) 112 can in turn determine the number and/or assignment of parent nodes and child nodes.

In some embodiments, not all client machines in an AVC session are assigned as a parent node or child node. In these embodiments, some client machines may be neither a parent node, nor a child node. These client machines may directly receive a stream of the AVC session from the Media Distribution Server (MDS) 102. In this scenario, the client machines that are not assigned as parent or child nodes can receive a better signal, experience better battery life, if they are a portable battery-operated device, or just be used by the mesh orchestrator 110 to better optimize the mesh network. For example, if there are three parent nodes, and each parent node can reliably service four child nodes, then the mesh orchestrator 110 can have options in designing or configuring the mesh network. In one option, one parent node can serve five child nodes. In another option, the mesh orchestrator 110 can configure more than three parent nodes. In another option, the mesh orchestrator 110 can have a client machine act as neither a parent nor a child.

In some embodiments, a client machine may include a configuration setting or preference indicating whether the client machine is (1) not to be used as a parent node, (2) is not to be used as a child node, (3) desires to be used as a parent node, and/or (4) desires to be used as a child node only. The mesh orchestrator 110 may evaluate the client machine's configuration setting or preference when assigning the client machine to act a parent node or as a child node. In such cases where the configuration setting or preference indicates that the client machine is not to be used as a parent node or child node, then the client machine would not be assigned the precluded node type.

Furthermore, the design of the mesh network can be dynamic, where the numbers and/or assignments of parent nodes and child nodes can be dynamically modified in real time. For example, a child node may be reassigned to a different parent node. A child node may also be reassigned as a parent node. A parent node may be reassigned as a child node during an AVC session, and the parent node's assigned child nodes may be reassigned to other parent nodes. Other dynamic assignment of parent nodes or child nodes can also be implemented. Furthermore, the assignment of parent nodes and child nodes can be a one-to-one assignment, where one parent node is assigned to one child node. The assignment can also be a one-to-many assignment, where one parent node is assigned to more than one child node, or more than one parent nodes are assigned to a child node. The assignment can also be a many-to-many assignment, where multiple parent nodes are assigned to multiple child nodes and vice versa.

In some embodiments, the mesh orchestrator 110 can receive or otherwise have access to data, which can be used to optimize the operations of the local network of the recipient 103, as they relate to conducting an AVC session. For example, data and/or instructions from the mesh orchestrator 110 can be used to determine how a parent node sends an AVC stream to its assigned child node(s). The mesh orchestrator 110 can influence and/or instruct the local area network of the recipient 103 to send an AVC session stream via the use of multiple different types of wireless and/or wired network technologies, depending on the available connections in the local network of the recipient 103. Furthermore, the details of the transfer of an AVC session stream from a parent node to a child node can also be dynamically adjusted to provide an optimized reliable AVC session experience to both the parent and child nodes. Various wireless and wired technologies can be used.

Examples network and communication technologies, which can be used by the mesh orchestrator 110 can include local area network (LAN), WiFi, Bluetooth, cellular network, wireless personal area network (PAN), wireless local area network (LAN), wireless wide area network (WAN), wireless ad hoc network, and other wired and wireless networks and communication protocols.

In some embodiments, the mesh orchestrator 110 may configure a mesh network based on a predetermined ratio of child nodes to a parent node. This functionality allows the mesh orchestrator 110 to create a parent node for a predetermined number of child nodes. During a video communication's session, such as a video-based webinar, the mesh orchestrator 110 may be configured to create 1 parent node per n child nodes, where n is a positive integer number greater than 1. For example, n may be set to 20, so where 100 attendees are joining the webinar using their respective client machines from a similar location or similar local area network, the mesh orchestrator 110 may create 5 parent nodes to distribute streaming data to 5 groups of 20 child nodes.

The mesh orchestrator 110 may also evaluate whether a parent node, given an available network data bandwidth, would function properly with the total number of child nodes assigned to the parent node. The mesh orchestrator 110 may automatically adjust the predetermined number of preassigned n child nodes to a lower number of m child nodes (where m<n, and m is a positive integer number greater than 1), where the available network data bandwidth would not support the preassigned n child nodes. In this instance, the mesh orchestrator 110 may adjust the number of child nodes to a lower number of child nodes assigned to a parent node. For example, the maximum number of child nodes may be adjusted to m=10 child nodes being assigned to a parent node for the available network data bandwidth of a local network.

In some embodiments, the mesh orchestrator 110 may provide for user configuration, via a user interface, allowing the user to set one or more values for an allocated bandwidth reserved for a particular network location or locations. The mesh orchestrator 110 may generate and display a user interface, including data input fields to receive a location (such as a city), a public IP address and a subnet IP address range. These data input fields represent a logical network location. The mesh orchestrator 110 may use the input values to adjust or allocate a bandwidth allocation that limits the total number of parent nodes that may be created for a particular logical network location. For example, a location bandwidth may be set to 50 Mbps/media stream=1.5 Mbps=33.3 maximum concurrent streams. The mesh orchestrator 110 may then use both the predetermined ratio of child nodes to a parent node and the bandwidth allocation settings to create a suitable number of parent nodes to accommodate the total number of client machines in a given network bandwidth situation. This functionality provides the generation of a dynamic mesh network and avoids the potential of network oversaturation due to too many parent nodes being created and requesting media streams.

In some embodiments, if the values for logical network locations and/or bandwidth allocation is not configured, the mesh orchestrator 110 may group and analyze quality of service (QOS) data from the parent nodes with the same egress IP address of a local network in real time. The mesh orchestrator 110 may determine a dip or reduction in QOS values from parent nodes that may indicate a saturation situation at the edge of the network. In such situations, the mesh orchestrator 110 may scale down or reduce the number of parent nodes by demoting lower powered parent nodes and reconverge its child nodes. The mesh orchestrator 110 may concurrently scale up or increase the number of child nodes that are connected to those parent nodes that have increased or greater processing capability. This functionality reduces the processing load at an edge network.

In some embodiments, the mesh orchestrator 110 provides a user interface allowing a user to adjust parameters for the creation of the mesh network while considering mesh efficiency and mesh stability. For example, the mesh orchestrator 110 may generate and provide for the display of a user interface with a slider bar with mesh efficiency and mesh stability configured via the slider bar (e.g., the slider bar 202 of FIG. 2). The mesh orchestrator 110 may apply processing to provide a balance for the mesh network weighting mesh efficiency and mesh stability. The slider bar may include 5 positions or steps on the slider bar. For example, the slider bar may include 1 and 2 positions on a mesh efficiency side of the slider, a 3 position being a default behavior of the mesh orchestrator 110, and 4 and 5 positions a mesh stability side of the slider bar. This functionality provides control and flexibility to lightly tune the mesh network and weight operation of the mesh network as to mesh efficiency and mesh stability and.

As to mesh efficiency, mesh efficiency processing steps may utilize the least number of parent nodes required to support a total number of child nodes in any given video-based webinar. The mesh orchestrator 110 may use the predetermined number child nodes to parent node ratio and increase the ratio to facilitate the lowest amount of bandwidth required to support a mesh media redistribution. In this configuration, and increased amount of network bandwidth is being saved, but the possibility of a large mesh convergence is greater because there are fewer parent nodes. This situation may leave the webinar with less parent nodes and may impact and impact more child nodes.

As to mesh stability, mesh stability processing steps may utilize the greatest number of parent nodes that a site network edge can support. This allows each parent node of the mesh network to support the fewest number of child node possible for that given webinar. In this configuration, the bandwidth at the network edge is not being as optimized, but the risk of a mesh convergence is reduced as fewer child nodes would be impacted if any parent nodes leaves the video communications session (e.g., disconnecting from the MDS).

As described above, the mesh orchestrator 110 may utilize the preconfigured mesh ratio of child to parent nodes. Also, mesh orchestrator 110 may use preconfigured values for allocated bandwidth reserved for a video-based webinars per a location or for multiple locations. The mesh orchestrator 110 may use these preconfigured values to set an initial number of parent nodes for these locations for every unique video-based webinar (e.g., video-based communication's session) using the mesh network configuration as described below and then adjust the number of child nodes that connect to parent nodes thereby ensure that all hosts can join the mesh-based webinar using a particular parent node's processing capability. In some embodiments, the mesh orchestrator 110 may determine an optimal initial mesh ratio of child nodes to a parent node by performing the following steps. In a first step, the mesh orchestrator 110 receives a user input specifying a maximum bandwidth (BAN) per site that is being allocated for webinars. In a second step, the mesh orchestrator 110 receives a selection of desired client performance level (PER) via a bandwidth selector slider (such as the slider 202 of FIG. 2). For example, a PER=3 Mbps of may be selected. The system may use a default PER value if a selection is not made. In a third step, the mesh orchestrator 110 determines a bandwidth per participant (BP) value: Maximum bandwidth (BAN) by number of participants in a specific webinar (PR) where BP=BAN/PR. In a fourth step, the mesh orchestrator 110 determines an initial number of parent nodes at a webinar start, where the number of parent nodes (PAR)=PER/BP. Combined the steps may be performed by applying determining: PAR=PER×PR/BAN or Number of parent nodes=Client performance level×Number of participants/Maximum bandwidth at location.

In some embodiments, the mesh orchestrator 110 may generate a client node to parent node assignment list. This assignment list may include a parent node identifier (such as an IP address, host name and/or a MAC address of a particular client machine). The list may include one or more child node identifiers (such as an IP address, host name and/or a MAC address of a particular client machine). This assignment list may be used by transmitted to the respective client machines which then may perform the role of either a parent node or child node for which the client machine is assigned. An exemplary assignment list may include information as indicated in Table 1.

TABLE 1

| Client Machine Identifier | Assigned Node Type | Assigned Parent Node | Failover Parent Node |
|---|---|---|---|
| 192.168.0.3 | parent node | none | hostname 3 |
| 192.168.0.22 | child node | 192.168.0.3 | 192.168.0.77 |
| 192.168.0.35 | parent node | 192.168.0.3 | hostname 3 |
| 192.168.0.44 | child node | 192.168.0.35 | 192.168.0.77 |
| 192.168.0.55 | child node | 192.168.0.3 | 192.168.0.77 |
| 192.168.0.77 | parent node | none | hostname 3 |
| hostname 1 | child node | 192.168.0.77 | 192.168.0.3 |
| hostname 2 | child node | 192.168.0.77 | 192.168.0.3 |
| hostname 3 | standby parent node | none | none |

The assignment list may be distributed in whole or part to the respective client machine. The client machines then may use the information in the assignment list to set the respective client machine to operate as a child node, a parent node, a parent and child node or a standby parent node. A client machine that is assigned as a parent node would receive a video, audio and/or other multimedia stream and then redistribute the received video, audio and/or other multimedia stream to child nodes that have been assigned to the parent node. For example, Table 1 illustrates a list of client machine identifiers (e.g., a unique IP address, host name, or MAC address, an assigned node type (e.g., a parent node, a child node, or a standby parent node), an assigned parent node (e.g., client machine identifier that is acting as a parent node), and a failover parent node (e.g., a client machine identifier for a parent node to switch over to).

In some embodiments, a client machine may act as both a parent node and a child node. In this case, the client machine may have other client machines assigned to the client machine, where the other client machines may also serve as both a parent node and a child node. For example, a client machine that is acting as parent node may receive data packets and transmit a copy of the data packets to any of the client machines that are child nodes assigned to the parent node. This functionality may be performed by various techniques of TCP/IP and/or UDP packet forwarding such that the data stream received by the parent node is transmitted by the receiving parent node to one or more of assigned child nodes. As such, the parent node may act as a receiver of commands, data, streaming media and the parent node may transmit the received data to its assigned child nodes. In some embodiments, a parent node may act as a selective forwarding unit.

In some situations, a client machine that is acting as a parent node may fail, become unresponsive and/or its processing capabilities overburdened. As described above, a parent node may periodically evaluate itself, for example by determining QOS values. The QOS values may be periodically transmitted by a parent node to the mesh orchestrator 110 and/or to a child node that has been assigned to the parent node. The mesh orchestrator 110 and/or the child node may evaluate the QOS values and determine whether to modify the mesh network. For instance, a child node may switch over to a predetermined failover parent node where the QOS value indicate a problem with the parent node. In this context, the child node connects to the failover parent node, and the failover parent node now acts as the parent node for the child node. After the connection, the new parent node begins transmitting a data stream to the child node.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 7:
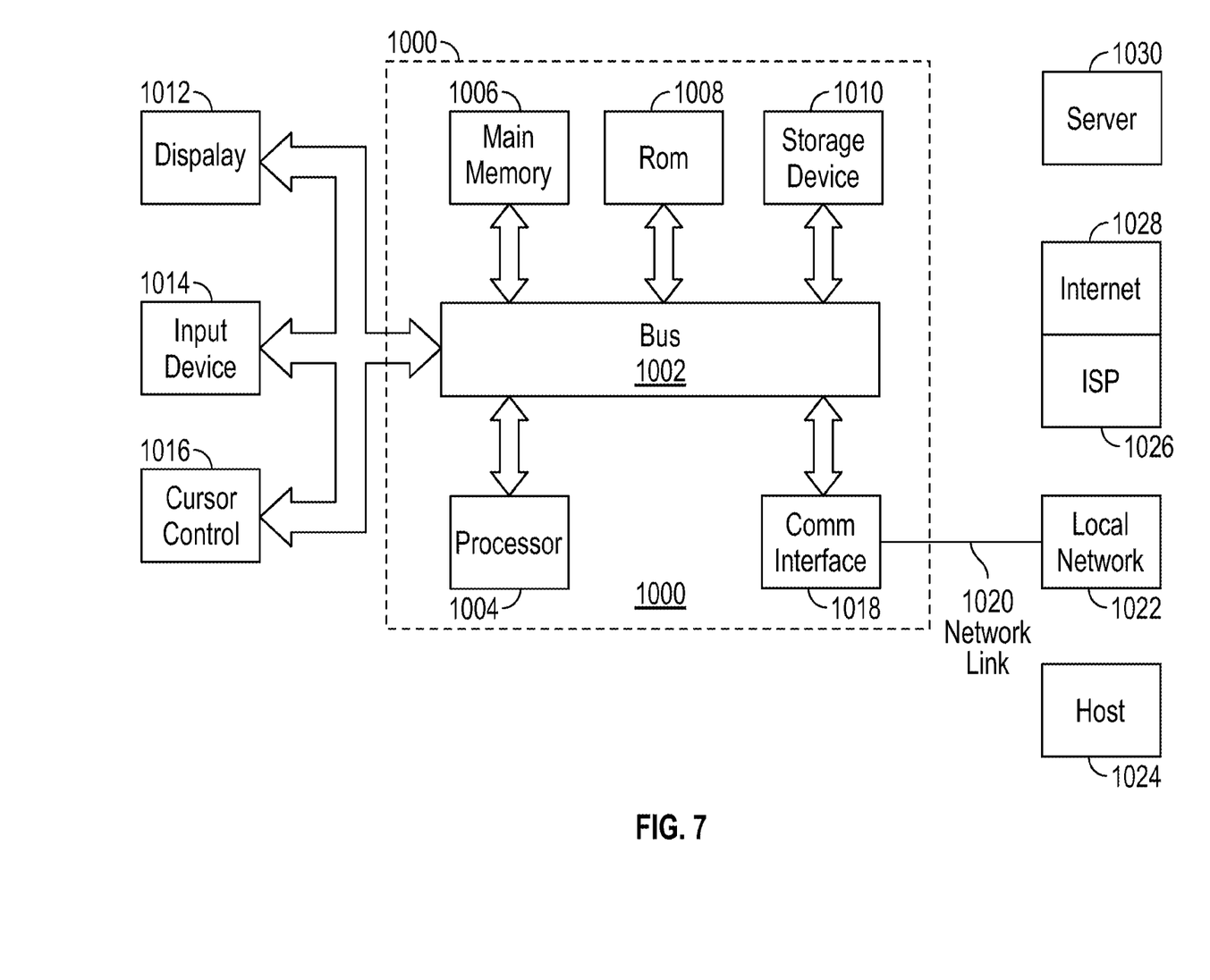
FIG. 7 is a block diagram that illustrates a computer system upon which one or more described embodiment can be implemented.

For example, FIG. 7 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random-access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

EXAMPLES

It will be appreciated that the present disclosure may include any one and up to all of the following examples and their combinations.

Example 1: A method comprising: determining a mesh reliability variable; generating a mesh network, comprising: based on the mesh reliability variable, assigning a first portion of client machines from a group of client machines to operate as parent nodes, and assigning a second portion of client machines from the group of client machines to operate as child nodes in the mesh network; and assigning child nodes to parent nodes; and delivering a media data stream to the parent nodes, wherein the media data stream is provided from parent nodes to assigned child nodes.

Example 2: The method of Example 1, wherein the mesh reliability variable comprises a sliding scale, between a bandwidth saving mode and a streaming resiliency mode, the bandwidth saving mode comprising assigning a minimum number of parent nodes subscribing to the media data stream such that the media data stream is delivered to the parent nodes and child nodes using a minimal amount of network bandwidth of the recipient, the streaming resiliency mode comprising assigning an optimal number of parent nodes subscribing to the conference stream such that the mesh network has optimal stability.

Example 3: The method of some or all of Examples 1 and 2, wherein the mesh reliability variable comprises a maximum and a minimum, the maximum corresponding to a maximum number of client machines assigned as parent nodes allowable by a network bandwidth of the recipient, and the minimum corresponding to a minimum number of client machines assigned as parent nodes such that the media data stream is delivered to the parent nodes and the child nodes using a minimal amount of network bandwidth of the recipient.

Example 4: The method of some or all of Examples 1-3, wherein a client machine's past performance in a previously generated mesh network during an online conference is used as a factor to determine whether a client machine is assigned as a parent node or a child node.

Example 5: The method of some or all of Examples 1-4, wherein generating the mesh network further comprises an artificial intelligence network determining a number of parent nodes and child nodes and an assignment of each client machine, to yield a mesh network stability variable equal to the mesh reliability variable.

Example 6: The method of some or all of Examples 1-5, wherein generating the mesh network further comprises: initializing an artificial intelligence network having inputs comprising one or more of available network bandwidth of the recipient, performance indicators of each client machine, and the mesh reliability variable, wherein the artificial intelligence network has outputs comprising the number of parent nodes and child nodes in the mesh network and assignments of client machines as parent nodes and child nodes; and generating the mesh network according to the outputs of the artificial intelligence network.

Example 7: The method of some or all of Examples 1-6, wherein generating the mesh network further comprises: ranking client machines based on one or more performance indicators; and assigning client machines as parent nodes based on performance indicators and based on the mesh reliability variable.

Example 8: The method of some or all of Examples 1-7, wherein child nodes are assigned to parent nodes based on the performance indicators of both the child node and the parent node.

Example 9: The method of some or all of Examples 1-8, wherein the performance indicators are used to determine the number of child nodes assigned to each parent node.

Example 10: The method of some or all of Examples 1-9, wherein the performance indicators are used to assign one child node to two parent nodes such that the child node receives a portion of the media data stream from each assigned parent node.

Example 11: The method of some or all of Examples 1-10, wherein the mesh reliability variable is a static variable that does not change for the duration of the mesh network.

Example 12: The method of some or all of Examples 1-11, wherein the mesh reliability variable is dynamically adjusted based on changes to at least one of network conditions, the total number of client machines operating in the mesh network, the available network bandwidth, performance indicators of the client machines, and bandwidth requirements of the mesh network, and wherein the mesh network is dynamically altered based on adjusted mesh reliability variable.

Example 13: A non-transitory computer storage that stores executable program instructions that, when executed by one or more computing devices, configure the one or more computing devices to perform operations comprising: determining a mesh reliability variable; generating a mesh network, comprising: based on the mesh reliability variable, assigning a first portion of client machines from a group of client machines to operate as parent nodes, and assigning a second portion of client machines from the group of client machines to operate as child nodes in the mesh network; and assigning child nodes to parent nodes; and delivering a media data stream to the parent nodes, wherein the media data stream is provided from parent nodes to assigned child nodes.

Example 14: The non-transitory computer storage of Example 13, wherein the mesh reliability variable comprises a sliding scale, between a bandwidth saving mode and a streaming resiliency mode, the bandwidth saving mode comprising assigning a minimum number of parent nodes subscribing to the media data stream such that the media data stream is delivered to the parent nodes and child nodes using a minimal amount of network bandwidth of the recipient, the streaming resiliency mode comprising assigning an optimal number of parent nodes subscribing to the conference stream such that the mesh network has optimal stability.

Example 15: The non-transitory computer storage of some or all of Examples 13 and 14, wherein the mesh reliability variable comprises a maximum and a minimum, the maximum corresponding to a maximum number of client machines assigned as parent nodes allowable by a network bandwidth of the recipient, and the minimum corresponding to a minimum number of client machines assigned as parent nodes such that the media data stream is delivered to the parent nodes and the child nodes using a minimal amount of network bandwidth of the recipient.

Example 16: The non-transitory computer storage of some or all of Examples 13-15, wherein a client machine's past performance in a previously generated mesh network during an online conference is used as a factor to determine whether a client machine is assigned as a parent node or a child node.

Example 17: The non-transitory computer storage of some or all of Examples 13-16, wherein generating the mesh network further comprises an artificial intelligence network determining a number of parent nodes and child nodes and an assignment of each client machine, to yield a mesh network stability variable equal to the mesh reliability variable.

Example 18: The non-transitory computer storage of some or all of Examples 13-17, wherein generating the mesh network further comprises: initializing an artificial intelligence network having inputs comprising one or more of available network bandwidth of the recipient, performance indicators of each client machine, and the mesh reliability variable, wherein the artificial intelligence network has outputs comprising the number of parent nodes and child nodes in the mesh network and assignments of client machines as parent nodes and child nodes; and generating the mesh network according to the outputs of the artificial intelligence network.

Example 19: The non-transitory computer storage of some or all of Examples 13-18, wherein generating the mesh network further comprises: ranking client machines based on one or more performance indicators; and assigning client machines as parent nodes based on performance indicators and based on the mesh reliability variable.

Example 20: The non-transitory computer storage of some or all of Examples 13-19, wherein child nodes are assigned to parent nodes based on the performance indicators of both the child node and the parent node.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method comprising:
   hosting, by an audio/video conference (AVC) provider, an AVC in which client machines exchange media data streams with one another, wherein the AVC provider is remote from the client machines;
   assigning, by the AVC provider, a first portion of the client machines to operate as parent nodes in a mesh network, and assigning a second portion of the client machines to operate as child nodes in the mesh network;
   assigning, by the AVC provider, the child nodes to the parent nodes; and
   delivering, by the AVC provider, a media data stream associated with the AVC to the parent nodes, wherein the media data stream is provided from the parent nodes to the child nodes.

2. The method of claim 1, wherein a client machine's past performance in a previously generated mesh network during an online conference is used as a factor to determine whether the client machine is assigned as a parent node or a child node.

3. The method of claim 1, further comprising using an artificial intelligence network to determine a number of parent nodes and child nodes in the mesh network.

4. The method of claim 1, further comprising:
   ranking the client machines based on one or more performance indicators; and
   based on the ranking, assigning the first portion of the client machines to be the parent nodes and the second portion of the client machines to be the child nodes.

5. The method of claim 4, further comprising assigning a child node to a parent node based on a subset of the performance indicators corresponding to the child node and the parent node.

6. The method of claim 4, wherein the performance indicators are used to determine a number of child nodes to assign to each parent node.

7. The method of claim 4, wherein the performance indicators are used to assign one child node to two parent nodes such that the child node receives a portion of the media data stream from each assigned parent node.

8. The method of claim 1, wherein the AVC provider is associated with a first network, and wherein the client machines are associated with one or more second networks that are remote from the first network.

9. The method of claim 1, further comprising:
   receiving a value for a mesh reliability variable; and
   based on the mesh reliability variable, determining how many of the client machines to assign as parent nodes.

10. The method of claim 9, wherein the mesh reliability variable is dynamically adjusted based on changes to network conditions, a total number of client machines operating in the mesh network, an available network bandwidth, performance indicators of the client machines, or bandwidth requirements of the mesh network; and
    wherein a configuration of the mesh network is dynamically altered based on adjusted mesh reliability variable.

11. A non-transitory computer storage medium comprising processor-executable program instructions that, when executed by one or more computing devices of an audio/video conference (AVC) provider, configure the one or more computing devices to perform operations including:

hosting an AVC in which client machines exchange media data streams with one another, wherein the AVC provider is remote from the client machines;

assigning a first portion of the client machines to operate as parent nodes in a mesh network, and assigning a second portion of the client machines to operate as child nodes in the mesh network;

assigning the child nodes to the parent nodes; and delivering a media data stream associated with the AVC to the parent nodes, wherein the media data stream is provided from the parent nodes to the child nodes.

12. The non-transitory computer storage medium of claim 11, wherein a client machine's past performance in a previously generated mesh network during an online conference is used as a factor to determine whether the client machine is assigned as a parent node or a child node.

13. The non-transitory computer storage medium of claim 11, wherein the operations further comprise:

ranking the client machines based on one or more performance indicators; and based on the ranking, assigning the first portion of the client machines to be the parent nodes and the second portion of the client machines to be the child nodes.

14. The non-transitory computer storage medium of claim 13, wherein the performance indicators are used to determine a number of child nodes to assign to each parent node.

15. The non-transitory computer storage medium of claim 13, wherein the performance indicators are used to assign one child node to two parent nodes such that the child node receives a portion of the media data stream from each assigned parent node.

16. The non-transitory computer storage medium of claim 11, wherein the operations further comprise:

assigning a child node to a parent node based on performance indicators corresponding to the child node and the parent node.

17. The non-transitory computer storage medium of claim 11, wherein the AVC provider is associated with a first network, and wherein the client machines are associated with one or more second networks that are remote from the first network.

18. The non-transitory computer storage medium of claim 11, wherein the operations further comprise:

receiving a value for a mesh reliability variable as input from a user; and based on the mesh reliability variable, determining how many of the client machines to assign as parent nodes.

19. An audio/video conference (AVC) provider system comprising:

one or more processors; and one or more memories including instructions that are executable by the one or more processors to cause the one or more processors to perform operations including:

hosting an AVC in which client machines exchange media data streams with one another, wherein the AVC provider system is remote from the client machines;

assigning a first portion of the client machines to operate as parent nodes in a mesh network, and assigning a second portion of the client machines to operate as child nodes in the mesh network;

assigning the child nodes to the parent nodes; and delivering a media data stream associated with the AVC to the parent nodes, wherein the media data stream is provided from the parent nodes to the child nodes.

20. The AVC provider system of claim 19, wherein the operations include generating the mesh network by:

assigning the first portion of the client machines to operate as the parent nodes and the second portion of the client machines to operate as the child nodes; and assigning the child nodes to the parent nodes.

* * * * *